Figure 1:
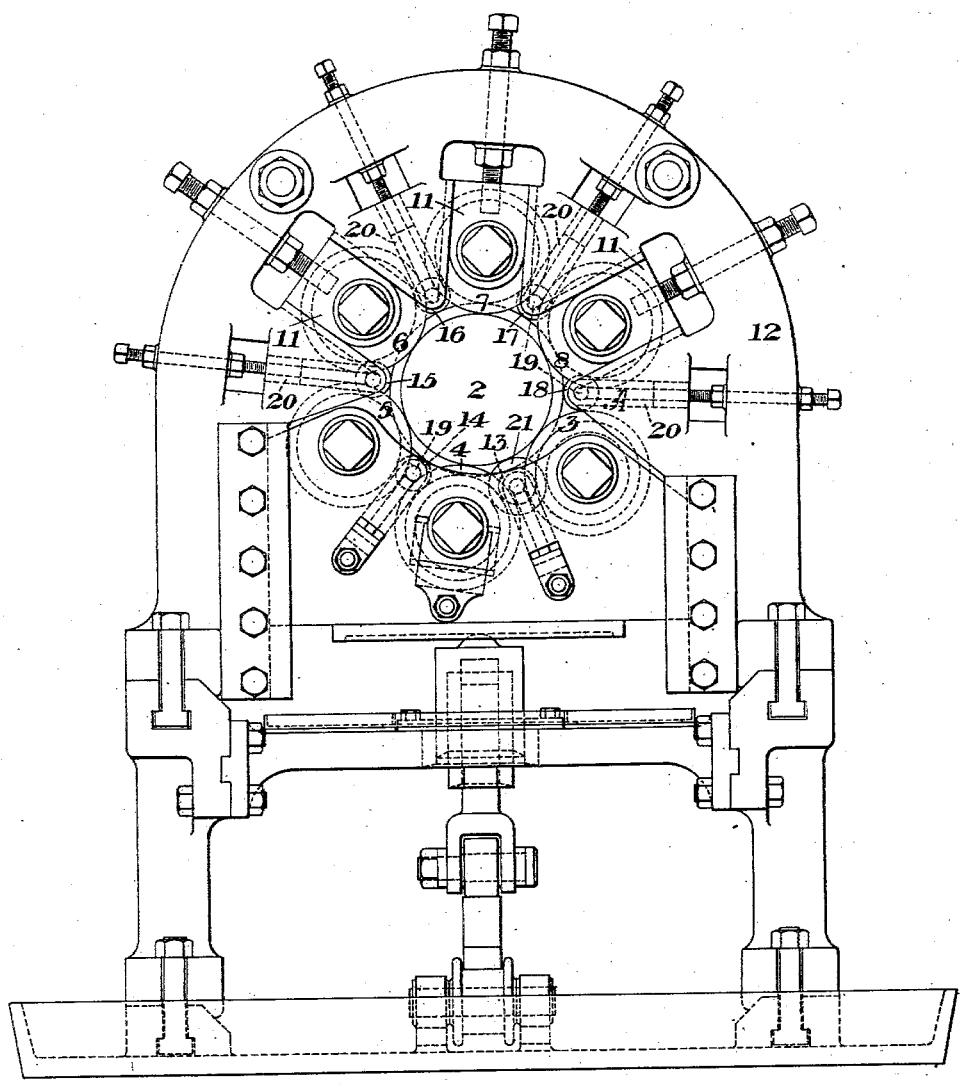

No. 740,149. PATENTED SEPT. 29, 1903.
G. W. LA VOO.
APPARATUS FOR WELDING RINGS.
APPLICATION FILED SEPT. 24, 1902.
NO MODEL. 2 SHEETS—SHEET 1.

WITNESSES
INVENTOR

No. 740,149. PATENTED SEPT. 29, 1903.
G. W. LA VOO.
APPARATUS FOR WELDING RINGS.
APPLICATION FILED SEPT. 24, 1902.
NO MODEL. 2 SHEETS—SHEET 2.
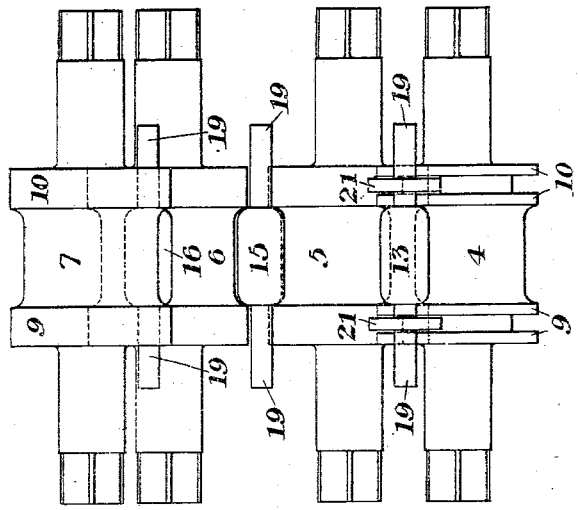
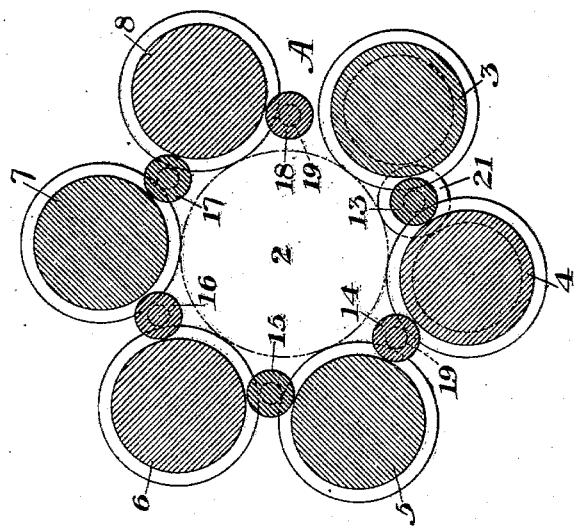
WITNESSES
Warren W. Swartz
INVENTOR
George W. La Voo
by Bakewell & Byrnes
his attys No. 740,149. Patented September 29, 1903.

UNITED STATES PATENT OFFICE.

GEORGE W. LA VOO, OF STEUBENVILLE, OHIO, ASSIGNOR OF ONE-HALF TO THE LA BELLE IRON WORKS, OF STEUBENVILLE, OHIO, A CORPORATION OF OHIO.

APPARATUS FOR WELDING RINGS.

SPECIFICATION forming part of Letters Patent No. 740,149, dated September 29, 1903.

Application filed September 24, 1902. Serial No. 124,612. (No model.)

*To all whom it may concern:*

Be it known that I, GEORGE W. LA VOO, of Steubenville, Jefferson county, Ohio, have invented a new and useful Apparatus for Welding Rings, of which the following is a full, clear, and exact description, reference being had to the accompanying drawings, forming part of this specification, in which—

Figure 1 is an end elevation of a rolling-mill constructed in accordance with my invention. Fig. 2 is a central vertical section of the rolls with the housings removed; and Fig. 3 is an inner face view of one-half of the rolls in position with the mandrel removed, the housings being broken away.

My invention relates to the welding of metal rings—such as pipe-couplings, thread-protectors, &c.—by means of cluster-rolls surrounding a mandrel; and its object is to prevent the front end of the heated blank from passing out between any of the shaping-rolls, which results in welding the blank around one of such rolls, to cause the blank to clasp the mandrel tightly and make rings of uniform size, and, further, to prevent the metal from looping out between the shaping-rollers.

To that end my invention consists in providing guides between the shaping-rolls of the cluster which are preferably in the form of rotary rollers arranged to hold the blank in proper position and prevent improper action.

In the drawings, 2 indicates the usual mandrel around which the ring is formed, and 3, 4, 5, 6, 7, and 8 represent the shaping-rolls, having the usual curved pass or groove formed between end collars 9 and 10. These rolls may be supported in adjustable bearings 11, which slide within radial guideways in the housings 12. The roll 3 and the opposite roll 5 I have shown in fixed bearings, as it is not found necessary to adjust these rollers.

Between the shaping-rolls and around the mandrel I provide rotary guides consisting of small rollers 13, 14, 15, 16, 17, and 18, these rollers being preferably of the form shown in Fig. 3, the body being rounded at the ends and shaped to fit between the pair of shaping-rolls. These guiding-rollers are preferably provided with shafts or necks 19, which are mounted in adjustable bearings 20, by which the rollers may be moved toward and from the mandrel. The rollers 13 and 14 need not be adjusted, and I have shown them in fixed bearings. The guiding-rollers may be rotated merely by frictional contact with the metal being rolled; but I prefer to positively rotate the roller 13 by means of collars 21 upon its necks, which enter grooves in the collar portions 9 and 10 of the roll 3, so that the roll 13 is driven by the mandrel 2. It will be understood that where rotary guides are used they may be driven in many different ways. For example, they may be provided with gear-wheels intermeshing with gears on the roll-necks, or they may be driven by external connections.

In operating the mill the shaping-rollers are driven by connections in the usual manner, and as the heated blank enters at the point marked A, Fig. 2, between the roll 3 and the rotary guide 18 its end is bent down and started upon the mandrel. This end then contacts with the rotary guide 13, which forces it against the mandrel, and as it passes each successive shaping-roller the successive rotary guides hold it closely in contact with the mandrel and prevent looping out between the shaping-rolls. During this action the collars of the shaping-rolls work upon the hot metal and shape and hold it in place. It is found in practice that these small guiding-rollers effectually prevent the entering end from passing out between the shaping-rolls, and hence prevent welding a ring around one of these shaping-rolls. They also force the blank tightly on the mandrel, thus making couplings of uniform diameter, whereas without their use the coupling is liable to run loose on the mandrel, giving a variation in the size. They also prevent the looping out between the shaping-rollers, which has heretofore caused the coupling to be formed in an irregular circle. The guides may rotate or not, as desired, and many variations may be made in the form and arrangement of the rotary guides when used in their number and the means for driving them without departing from my invention.

I claim—

1. A mill for rolling and welding hot-metal blanks into rings, comprising a mandrel, a cluster of shaping-rolls arranged around and inclosing the mandrel, each of the shaping-rolls having end collars arranged to work upon the hot metal, and a rotary guide of smaller diameter than the shaping-rolls and arranged in the gap between two of them, said guide having an enlarged portion between the collars of the shaping-rolls; substantially as described.

2. A mill for rolling hot-metal blanks into rings and welding them comprising a mandrel, a cluster of shaping-rolls arranged around and inclosing the mandrel, each of the shaping-rolls having end collars arranged to work upon the hot metal, a feed-roll, and a rotary guide of smaller diameter than the feed-roll and arranged in the gap between it and the next shaping-roll, said guide having an enlarged body fitting between the collars of the shaping-rolls; substantially as described.

3. A mill for rolling hot-metal blanks into rings and welding them, comprising a mandrel, a cluster of shaping-rolls arranged around and inclosing the mandrel and having end collars, rotary guides of smaller diameter than the shaping-rolls and located in the gap between them and the mandrel, said guides having enlarged bodies fitting between the collars of shaping-rolls and adjusting mechanism for at least a part of said guides; substantially as described.

4. A mill for rolling hot-metal blanks into rings and welding them, comprising a mandrel, shaping-rolls having collars and arranged around and inclosing the mandrel, a feed-roll arranged to feed the blank between the shaping-rolls and the mandrel, said feed-roll having a body fitting between the end collars of the shaping-roll and a guide located in the gap between two of the shaping-rolls and beyond the roll next to the feed-roll; substantially as described.

5. A mill for rolling hot-metal blanks into rings and welding them, comprising a mandrel, shaping-rolls having end collars and arranged around and inclosing the mandrel, a feed-roll and rotary guide located in the gap between two of the shaping-rolls and beyond the roll next to the feed-roll, said guide fitting between the collars of the shaping-rolls and being driven by friction with the metal being rolled to shape; substantially as described.

In testimony whereof I have hereunto set my hand.

GEORGE W. LA VOO.

Witnesses:
J. E. WRIGHT,
JOHN BAXTER.